United States Patent
Zeng et al.

(10) Patent No.: US 6,792,129 B1
(45) Date of Patent: Sep. 14, 2004

(54) DIGITAL WATERMARKING IN A PERCEPTUALLY UNIFORM DOMAIN

(75) Inventors: Wenjun Zeng, Vancouver, WA (US); Shawmin Lei, Camas, WA (US)

(73) Assignee: Sharp Laboratories of America, Camas, WA (US)

( * ) Notice: Subject to any disclaimer, the term of this patent is extended or adjusted under 35 U.S.C. 154(b) by 559 days.

(21) Appl. No.: 09/645,105

(22) Filed: Aug. 23, 2000

Related U.S. Application Data

(60) Provisional application No. 60/150,657, filed on Aug. 25, 1999.

(51) Int. Cl.[7] .................................................. G06K 9/00
(52) U.S. Cl. ........................ 382/100; 382/248; 382/274
(58) Field of Search ................................ 382/100, 248, 382/250, 274

(56) References Cited

U.S. PATENT DOCUMENTS

| | | | |
|---|---|---|---|
| 5,748,763 A | 5/1998 | Rhoads | 382/115 |
| 5,930,369 A | 7/1999 | Cox et al. | 380/54 |
| 6,373,974 B2 * | 4/2002 | Zeng | 382/135 |
| 6,493,457 B1 * | 12/2002 | Quackenbush et al. | 382/100 |
| 6,556,689 B1 * | 4/2003 | Xia et al. | 382/100 |

OTHER PUBLICATIONS

"Perceptual Watermarks for Digital Images and Video" by Wolfgang et al. Proceedings of the IEEE, vol.: 87 Issue: 7, Jul. 1999. pp.: 1108–1126.*

Andrew B. Watson, "DCT Quantization Matrices Visually Optimized for Individual Images," 1993, SPIE vol. 1913, pp. 202–216.

Christine Podilchuk and Wenjun Zeng, "Image–Adaptive Watermarking Using Visual Models," 1998, IEEE, pp. 525–539.

Heidi Peterson, Albert Ahumada, Jr., and Andrew Watson, "An Improved Detection Model for DCT Coefficient Quantization," 1993, SPIE vol. 1913, pp. 191–201.

Mitchell Swanson, Bin Zhu and Ahmed Tewfik, "Transparent Robust Image Watermarking," IEEE Conf. 1996, pp. 1–4.

Wenjun Zeng and Bede Liu, "On Resolving Rightful Ownerships of Digital Images by Invisible Watermarks," ICIP 1997, pp. 1–4.

Andrew B. Watson, Robert Borthwick and Mathias Taylor, "Image Quality and Entropy Masking," SPIE vol. 3016, pp. 1–12.

* cited by examiner

Primary Examiner—Amelia M. Au
Assistant Examiner—Charles Kim
(74) Attorney, Agent, or Firm—Marger Johnson & McCollom

(57) ABSTRACT

Methods and apparatus for watermarking a digital media object, and for detecting watermarks, are presented. The basic concept underlying the disclosed approach is watermarking/detection in a transform space that allows the same level of watermarking to be applied to all samples. For instance, in one embodiment, a watermarking system first nonlinearly transforms the original signal to a perceptually uniform domain, and then embeds the watermark in this domain without varying the statistical properties of the watermark at each sample. At the watermark detector, a candidate image is transformed to the same perceptually uniform domain, and then correlated with the original watermark sequence. Under such conditions, it is shown that an optimal watermark detector can be derived. This approach is particularly attractive when the original image is unavailable at the detector, as it effectively prevents the image content from biasing the watermark detection score.

32 Claims, 7 Drawing Sheets

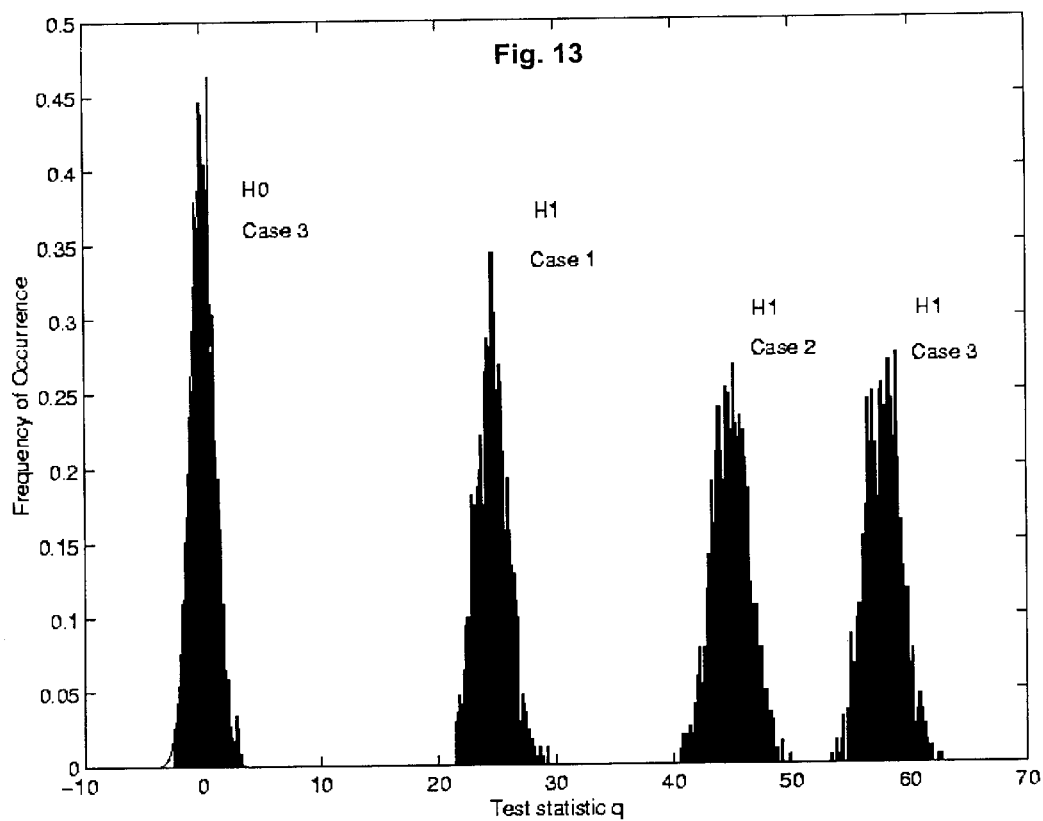
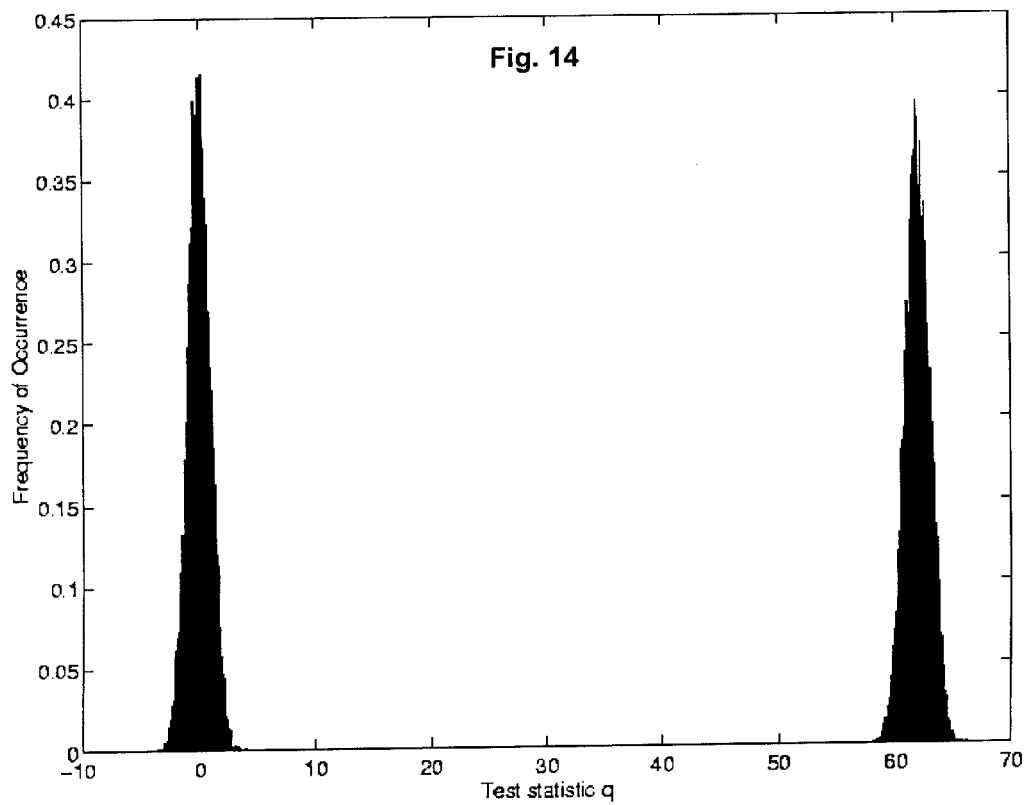

DIGITAL WATERMARKING IN A PERCEPTUALLY UNIFORM DOMAIN

This application claims benefit of 60/150,657 filed Aug. 25, 1999.

FIELD OF THE INVENTION

This present invention relates to digital watermarking of digital media, and more particularly to a method and apparatus for watermark insertion and detection in a perceptually uniform transform domain.

BACKGROUND OF THE INVENTION

Digital watermarks have been proposed as a means for copyright protection of digital media such as images, video, audio, and text. Digital watermarking embeds identification information directly into a digital media object by making small modifications to the object itself. A companion watermark detector can extract this "signature" from the watermarked media object. The extracted signature can be used to identify the rightful owner and/or the intended recipients, as well as to verify the authenticity of the object. The signature can also be used to embed some other useful information such as copy control information and parental control information.

For most applications, two basic desirable criteria for a watermarking scheme are perceptual invisibility and robustness to intentional/unintentional attacks. The watermark should be perceptually invisible, i.e., it should not noticeably interfere with the perceivable quality of the object being protected. The watermark should also be robust to common signal processing and intentional attacks. Particularly, the watermark should still be detectable even after common signal processing operations have been applied to the watermarked image.

The dual requirements of perceptual invisibility and robustness, unfortunately, conflict with each other. That is, the former suggests that the amount of watermark energy inserted into the object should be minimized, while the latter suggests the opposite. One of the fundamental issues in digital watermarking is thus to find the best trade-off between imperceptibility and robustness to signal processing.

One way to balance perceptual invisibility and robustness is by incorporating explicit human perceptual models in the watermarking system. The perceptual models provide an upper bound on the amount of modification one can make to the media content without incurring a perceptual difference. A watermarking system can operate just within this upper bound to provide the maximal robustness to intentional or unintentional attacks, given a desired perceived quality.

For example, when a watermark is applied to a visual object intended for human viewing, the watermarking system can exploit various properties of the human visual system (HVS). That is, some researchers have attempted to hide the watermark where it will least be noticed by a human viewer. In U.S. Pat. No. 5,930,369, entitled "Secure Spread Spectrum Watermarking for Multimedia Data", Cox et al. teach a method that operates in the frequency domain, distributing the watermark within the n largest low-frequency (but not DC) transform coefficients. Cox et al. teach that the amount of watermark signal inserted into a particular coefficient can also be made proportional to the value of the coefficient itself.

Other researchers have taught the use of explicit HVS models to vary watermark energy. Podilchuk and Zeng suggest such a system in "Image-adaptive watermarking using visual models," *IEEE Journal on Selected Areas in Comm.*, special issue on Copyright and Privacy Protection, vol. 16, no. 4, pp. 525–39, May 1998. Podilchuk and Zeng make use of frequency sensitivity, luminance sensitivity and the self-masking effect of the HVS to adaptively control the amount of watermark energy to be embedded into different transform coefficients/areas of the image. They suggest incorporating perceptual models in the watermarking system by deriving a just-noticeable-difference (JND) threshold for each DCT/wavelet coefficient, and using this JND threshold to control the amount of watermark signal inserted into each coefficient.

FIG. 1 illustrates, in block diagram 20, the watermark insertion scheme proposed by Podilchuk and Zeng. A frequency-based transform (e.g., a block based discrete cosine transform (DCT) of an original image $\{x_{i,j}\}$) produces a frequency-based representation of a digital media object $\{X_{u,v}\}$. JND calculator 24 uses frequency sensitivity, luminance sensitivity, and contrast masking models to compute a JND value $J_{u,v}$ for each $X_{u,v}$. Watermark embedder 26 receives $\{X_{u,v}\}$, $\{J_{u,v}\}$, and a watermark sequence $\{w_{u,v}\}$. For each component $X_{u,v}$, embedder 26 produces a corresponding output component $X^*_{u,v}$ using the formulation:

$$X^*_{u,v} = \begin{cases} X_{u,v} + J_{u,v} w_{u,v} & \text{if } X_{u,v} > J_{u,v} \\ X_{u,v} & \text{otherwise} \end{cases}$$

Finally, frequency-based inverse transform 28 inverts $X^*_{u,v}$ to produce the watermarked image $x^*_{i,j}$.

FIG. 2 illustrates, in block diagram 30, the watermark detection scheme proposed by Podilchuk and Zeng. The original image $x_{i,j}$ is input to a frequency-based transform 22 and JND calculator 24 identical to those used in FIG. 1, producing $X_{u,v}$ and $J_{u,v}$ as described above. The potentially-watermarked image $x^*_{i,j}$ is input to an identical frequency-based transform 32, producing a frequency-based representation of that image $X^*_{u,v}$. Adder 34 subtracts $X_{u,v}$ from $X^*_{u,v}$, producing a difference sequence $w^*_{u,v}$ that represents a potential watermark sequence (and/or noise). Correlator 36 correlates the original watermark sequence $w_{u,v}$ with the difference sequence scaled by the JNDs, $w^*_{u,v}/J_{u,v}$. Comparator 38 examines a resulting correlation figure, declaring the existence of the watermark if the correlation figure exceeds a selected threshold.

In another work, the watermark embedding takes place in the spatial domain, but the perceptual model is used in the frequency domain to shape the resulting (watermarked) coefficients to make sure the modification to each coefficient does not exceed the perceptual threshold. M. Swanson et al., "Transparent robust image watermarking," *Proc. Inter. Conf. Image Proc.*, vol. 3, pp. 211–14, September 1996.

The need for watermark detection without the assistance of an original data set exists in several circumstances. First, as a content provider, an automated search for your watermarked content, e.g., over the Internet, may be practically limited to a search without the original, because the automated searcher may have no good way of determining the corresponding original for each file examined. Second, in some circumstances it may make sense to add the watermark at the time the media object is first captured or created, in which case no "un"-watermarked copy exists. Likewise, for security or storage efficiency, it may make sense to destroy the original copy. And when ownership is to be proven, use of an "original" object may be disallowed in order to avoid questions that can arise as to whether the "original" was possibly derived from the "watermarked" object.

In each prior art method, the watermark embedding and detection are implemented in either the spatial pixel domain or a linear transform domain. As a result, the amount of watermark energy to be embedded into each spatial pixel or linear transform coefficient varies from pixel to pixel, or from transform coefficient to transform coefficient. This, in general, makes optimal watermark detection difficult to design and implement in these domains. These problems are compounded when the original image is not available to assist in watermark detection.

SUMMARY OF THE INVENTION

Whereas the prior art has focused on ways to add the appropriate level of watermarking on a per-sample basis, the present invention takes a different approach to watermarking. The basic concept underlying this approach is watermarking/detection in a transform space that allows the same level of watermarking to be applied to all samples. For instance, in one embodiment, a watermarking system first nonlinearly transforms the original signal to a perceptually uniform domain, and then embeds the watermark in this domain without varying the statistical properties of the watermark at each sample. At the watermark detector, a candidate image is transformed to the same perceptually uniform domain, and then correlated with the original watermark sequence. Under such conditions, it is shown herein that an optimal watermark detector can be derived. This approach is particularly attractive when the original image is unavailable at the detector, as it effectively prevents the image content from biasing the watermark detection score.

In one aspect of the invention, a method of inserting a watermark into a digital media object is disclosed. Each feature from a set of features extracted from a digital data set is transformed to a corresponding perceptual domain feature. A set of pseudorandom numbers, derived from a selected watermark key, is also provided. A set of watermarked perceptual domain features is calculated, each watermarked feature based on a corresponding perceptual domain feature and pseudorandom number. Finally, the watermarked perceptual domain features are transformed out of the perceptual domain to produce a set of watermarked features.

In another aspect of the invention, a second method of inserting a watermark into a digital media object is disclosed. In this method, a self-contrast masking figure is calculated for each feature from a set of features extracted from a digital data set. Also, a neighborhood masking figure is determined for each feature based on the amplitude of features in a selected neighborhood on the data set, the location of the neighborhood bearing a relationship to the location of the feature under consideration. A set of pseudorandom numbers, derived from a selected watermark key, is also provided. A set of watermarked features is calculated, each watermarked feature combining a feature from the digital data set with a corresponding pseudorandom number, with a relative weighting based on the self-contrast and neighborhood masking figures. This second method can be practiced using the first method, e.g., by using the self-contrast and neighborhood masking figures to perceptually transform the features from the digital data set, and then combining the transformed features with the pseudorandom numbers.

In yet another aspect of the invention, a method of detecting a watermark in a digital media object is disclosed. Each feature from a set of features extracted from a digital data set is transformed to a corresponding perceptual domain feature. A set of pseudorandom numbers, derived from a selected watermark key, are also provided. A correlation figure is calculated by correlating the perceptual domain features with the pseudorandom number set.

Apparatus for implementing each of the above methods is also disclosed. One preferred implementation is as an apparatus that comprises a computer-readable medium containing computer instructions for performing one of the methods using one or more processors.

One disclosed watermark detector comprises a perceptual transform and a correlator to correlate the output of the perceptual transform with a watermark sequence. The detector may optionally calculate the watermark sequence from a selected watermark key.

One disclosed watermarking system comprises both a perceptual transform and an inverse perceptual transform. A watermarker placed between the two transforms adds a watermark signature to a data set in the perceptual domain.

BRIEF DESCRIPTION OF THE DRAWING

The invention may be best understood by reading the disclosure with reference to the drawing, wherein:

FIG. 13 shows the results of watermark detection tests for several schemes for detecting perceptual model watermarks in the frequency domain; and FIG. 14 shows the results of watermark detection tests for detecting a perceptual model watermark in the perceptual domain.

DETAILED DESCRIPTION OF THE PREFERRED EMBODIMENTS

Several terms have been assigned particular meanings within the context of this disclosure. As used herein, a "digital media object" contains digital data that (possibly with transformation) is perceivable by a living or machine subject. Some examples of digital media objects are digital images, video, audio, arrangements of graphical elements such as text and symbols, and various combinations of these media. A "perceptual domain" is a domain wherein the features of a digital media object have been adjusted according to some knowledge of the limitations of the perceiving environment and/or perceiver of the object. For example, a feature can be scaled according to how much distortion can be hidden in that feature without the distortion becoming perceptible.

A "frequency-based representation" of a digital data set contains at least a partial frequency decomposition of an input signal. For instance, Fourier transforms, DCTs, Hadamard transforms, and wavelet transforms contain frequency coefficients. These transforms may span an entire object or a portion of the object (e.g., block-based transforms), and can be multi-dimensional if appropriate for the type of data in the digital data set.

Figure 1:
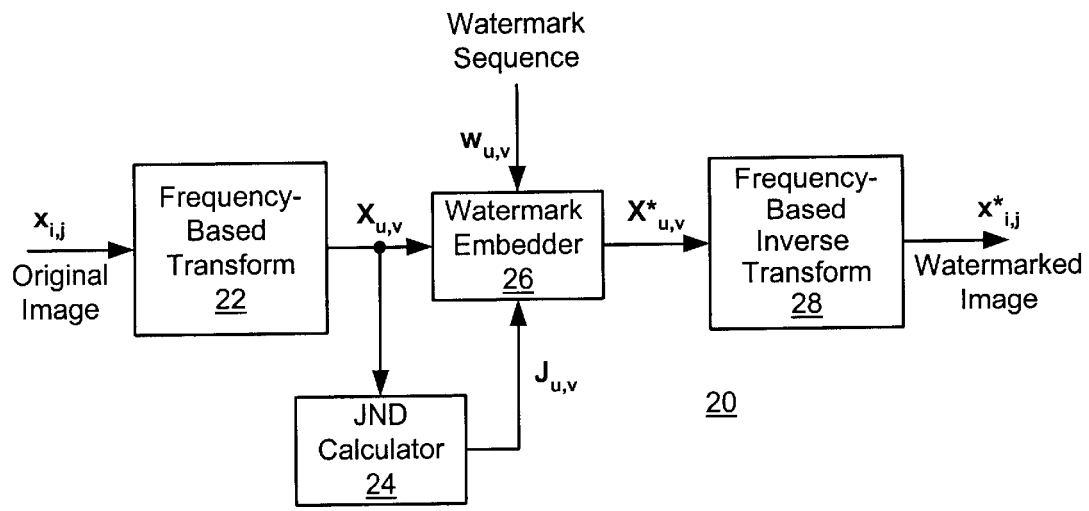
FIGS. 1 and 2 contain, respectively, block diagrams for a watermarking system and a watermark detector as taught in the prior art.
Figure 2:
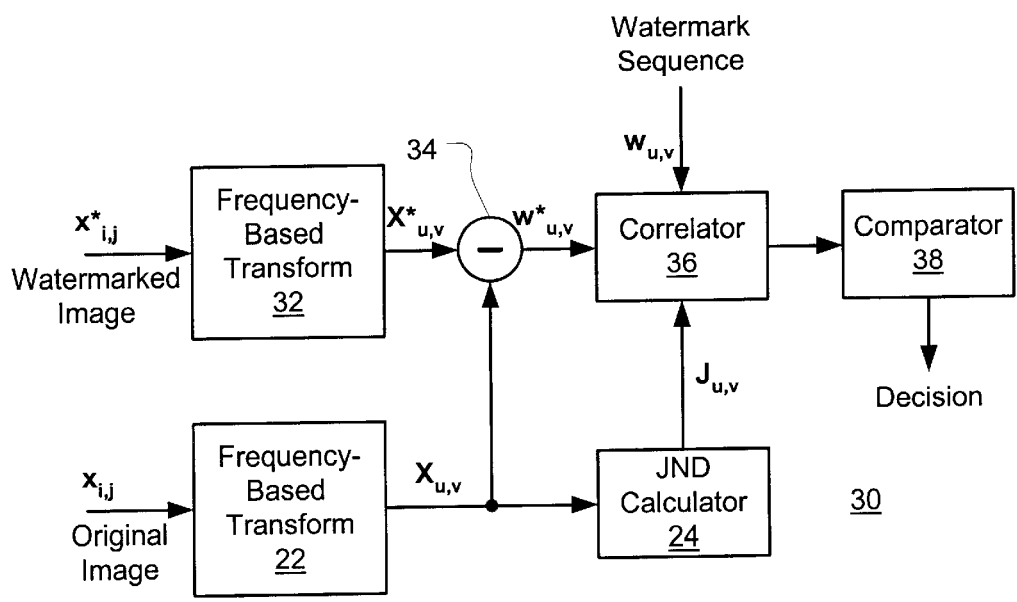
Figure 3:
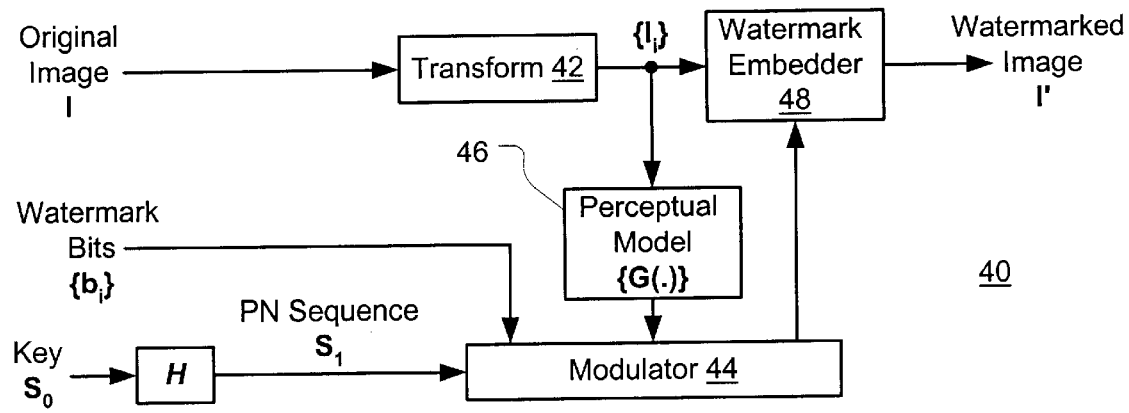
FIGS. 3 and 4 contain, respectively, block diagrams for a watermarking system and a watermark detector that introduce some concepts useful in the present invention.

FIG. 3 shows a general architecture 40 for a class of perceptual watermarking systems useful for digital image watermarking. Transform 42 performs, e.g., a DCT or wavelet transform of the original image I. A set of features $\{I_i\}$ is derived from the frequency-transformed version of the original image I. A private/public key $S_0$ (e.g., an owner name or ID) is mapped, using a one-way deterministic function H, to a single parameter that is then used as a seed to generate an i.i.d. pseudorandom noise (PN) sequence $S_1$ (or, equivalently $\{S_{1i}\}$). Modulator 44 modulates $S_{1i}$ by some information bits $\{b_i\}$ to be embedded (e.g., a binary logo image). Modulator 44 also multiplies the result by $G_i(I_i)$, where $G_i(.)$ could be a function of $I_i$ and is controlled by a visual model. Watermark embedder 48 adds the output of modulator 44 to $I_i$. The encoding process can be formulated as $$I'_i = I_i + G_i(I_i) b_i S_{1i} \quad (1)$$

Figure 4:
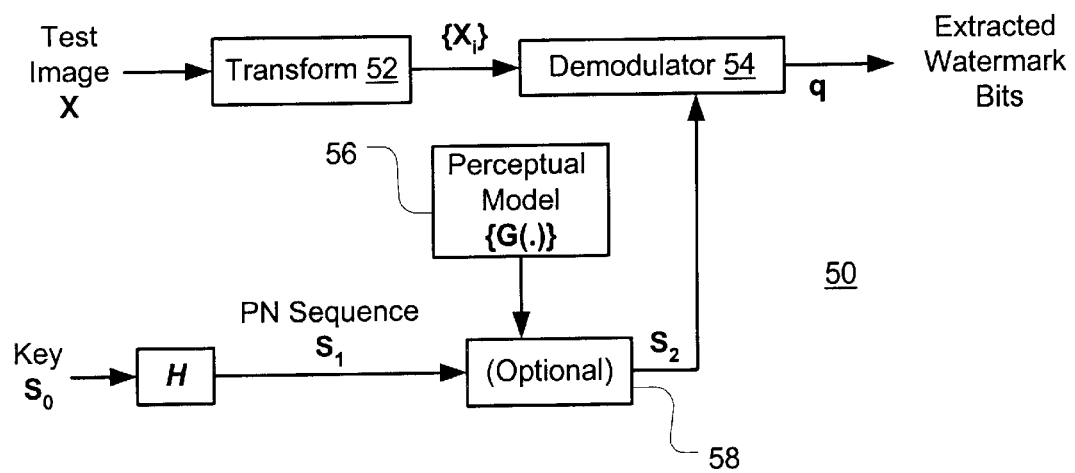

FIG. 4 shows a block diagram 50 for a companion watermark detector to watermarking system 40. A test image X is hypothesized to have been watermarked using key $S_0$ and system 40. Transform 52 performs the same transform on X that was performed by transform 42 on image I. A set of features $\{X_i\}$ is derived from transform 52's output. Demodulator 54 correlates $\{X_i\}$ with a pseudorandom sequence $S_2$ that is closely related to $S_1$ and the perceptual model used. The correlator output q is compared to a threshold T to determine the extracted watermark bits.

The embodiments described below will focus on the visual optimization process of a system such as the one represented in FIGS. 3 and 4 for marking digital images. These same principles can be applied to other types of media, using known models for those media types.

Without loss of generality, in the development below it is assumed that there are no other information bits except the key $S_0$ that is to be embedded. It is also assumed that the original image is not available at the detector. In this scenario, the correlator output q is compared to a threshold T to determine if the test image contains the watermark sequence derived from the key. Detection of the watermark is accomplished via the hypothesis test:

$$H_0: X_i = I_i + N_i \quad X_i \text{ does not contain the claimed watermark} \quad (2)$$

$$H_1: X_i = I_i + G_i(I_i)S_{1i} + N_i \quad X_i \text{ contains the claimed watermark}$$

where $N_i$ is noise, possibly resulting from some signal processing such as JPEG compression, etc.

Let $Y_i = X_i S_{2i}$. Demodulator 54 outputs the test statistic q $$q = \frac{\sum_{i=1}^{n} Y_i}{V_y \sqrt{n}} = \frac{M_y \sqrt{n}}{V_y} \quad (3)$$

where n is the size of the feature set $\{X_i\}$, and $M_y$ and $V_y^2$ are, respectively, the sample mean and sample variance of $Y_i$:

$$M_y = \left(\sum_{i=1}^{n} Y_i\right)/n; \quad V_y^2 = \left(\sum_{i=1}^{n} (Y_i - M_y)^2\right)/(n-1).$$

With some reasonable assumptions (including the assumption that $\{S_{2i}\}$ is zero mean and uncorrelated with the original image I), it can be shown that under $H_0$, for large n, q is approximately a normal distribution with zero mean and unit variance, i.e., $q \sim N(0, 1)$. Let E(.) denote the expectation operator. Under Hypothesis $H_1$ and for large n, it can also be shown that q follows a normal distribution N(m, 1), where $$m = \frac{(E(G_i(I_i)S_{1i}S_{2i}) + E(N_i S_{2i}))\sqrt{n}}{V_y}$$

By choosing a detection threshold T, one can quantify the false alarm detection probability, as shown in Table 1.

TABLE 1

| Threshold | $P_{err}(q > T)$ |
| --- | --- |
| 3 | 0.0013 |
| 5 | 2.86E-7 |
| 6 | 9.86E-10 |
| 8 | 6.22E-16 |
| 10 | 7.62E-24 |

It can also be proven that, if $G_i(.)$ is independent of $I_i$, then the choice of $S_{2i} = G_i S_{1i}$ is the optimal correlating signature that will result in the largest mean value m under $H_1$. On the other hand, if $G_i(.)$ is a function of $I_i$, and assume that $G_i(.)$ can be written as a product of two terms, i.e., $G_i(I_i) = U_i(I_i) W_i$ where $W_i$ is independent of $I_i$, then a good, but not necessarily optimal, choice for $S_{2i}$ is $S_{1i} W_i$. It should be noted that setting $S_{2i}$ to $G_i(I_i) S_{1i}$ is usually a very bad choice. This causes difficulty in designing optimal detection in the DCT/wavelet domain, since the best choices for $G_i(.)$ tend to have image-dependent components that are non-separable due to their non-linear transfer functions.

In Equation (1), the level of watermark embedding is controlled by $G_i$. This value has to be carefully chosen in order to guarantee imperceptibility of the watermark. One way to incorporate perceptual models in the watermarking system is to derive a JND for each DCT/wavelet coefficient, and then use this JND to control the amount of watermark energy to be inserted into each coefficient. For example, in the IA-DCT (Image-adaptive DCT) scheme proposed by Podilchuk and Zeng, a frequency threshold value is derived based on measurements of specific viewing conditions for each DCT basis function, which results in an image-independent 8×8 matrix of threshold values, denoted as $T_f(u,v)$, u,v=1, . . . , 8. Moreover, a more accurate perceptual model that also takes care of the luminance sensitivity and contrast masking effect of the human visual system is used to find the JND for each coefficient. Luminance sensitivity is estimated as $$T_f(u,v,b) = T_f(u,v)(X_{0,0,b}/X_{0,0})^a,$$

where $X_{0,0,b}$ is the DC coefficient for block b, $X_{0,0}$ is the DC coefficient corresponding to the mean luminance of the display, and a is a parameter which controls the degree of luminance sensitivity. A value of 0.649 is suggested for a in a perceptual model explained in Watson, "DCT quantization matrices visually optimized for individual images," *Proc.*

SPIE Conf. Human Vision, Visual Proc., and Digital Display IV, vol. 1913, pp. 202–16, 1993.

A contrast masking threshold, referred to as the JND, is derived as $$T_c(u,v,b) = \text{MAX}[T_f(u,v,b), T_f(u,v,b)(|X(u,v,b)|/T_f(u,v,b))^w],$$

where $X(u,v,b)$ is the value of the coefficient, w is a number between zero and one (Watson gives an example with w=0.7). The threshold simply implies that a larger coefficient can tolerate larger modification without incurring visual artifacts. Note that the JND here is coefficient-adaptive, unlike some others that are image-independent or region based. The JND $T_c(u,v,b)$ is then used as $G_i$ in Equation (1) to control the amount of watermark to be embedded into each coefficient. Note that in the IA-DCT scheme, the feature set $\{I_i\}$ is the set of DCT coefficients (excluding DCs) which are larger than their corresponding $T_f(u,v,b)$.

FIG. 13 shows typical distributions of the detector output q under different hypotheses using IA-DCT as the watermark encoding scheme and Equation (3) as the detector. In this example, $T_f(u,v,b)=T_f(u,v)$, i.e., luminance sensitivity is not considered, and w=0.33. In Case 1, $S_{2i}=B_i\ C_i(I_i)\ S_{1i}$; in Case 2, $S_{2i}=S_{1i}$; and in Case 3, $S_{2i}=B_i\ S_{1i}$, where $B_i$ and $C_i(I_i)$, respectively, denote the $T_f$ and $(|X(u,v,b)|/T_f(u,v,b))^w$ components of $T_c$ for each feature point. The 512×512 "Lenna" image was used, and several runs were made using different pseudorandom watermarking sequences.

By observation of FIG. 13, it can be seen that the distribution of q in each case is normal-distribution-like. FIG. 13 also suggests that different choices of $S_2$ will have different detection performances. Case 3 appears to be the best choice among the three, although it may not be the optimal solution. The optimal solution is not straightforward here.

In the preferred embodiments, a watermarking detector (and, preferably, the companion watermarking system) use perceptual models in a different way than the IA-DCT approach. The image data is first transformed to a domain that is perceptually uniform. In this perceptually-uniform domain, a small variation in one sample is perceptually no different than a similar variation in any other. There is a common JND for all the samples, disregard the sample's frequency, orientation, location and amplitude. As a result, this common JND can be used to control the amount of watermark energy to be embedded in this domain. Note that, in general, this approach fits within the class of perceptual watermarking systems and detectors shown in FIGS. 3 and 4, with transform block 42 or 52 employing a nonlinear transformation, and G(.) set to a constant. Alternately, this approach can be represented by watermarking system 60 of FIG. 5 and watermark detector 70 of FIG. 6.

Figure 5:
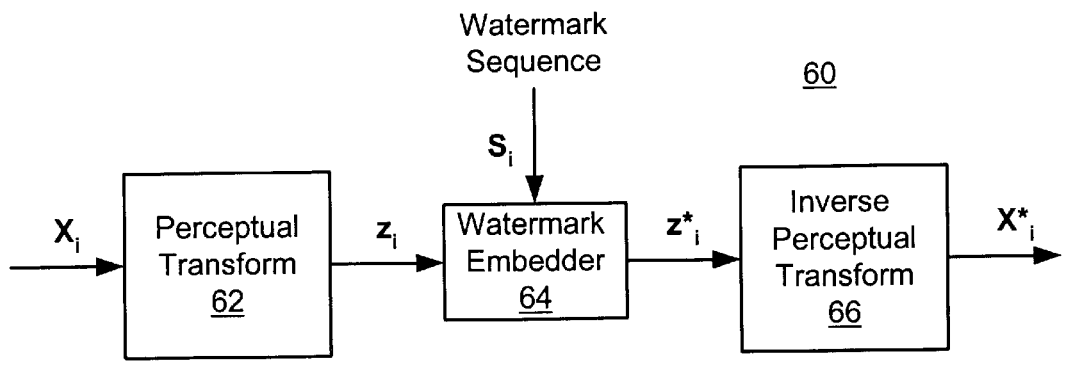
FIGS. 5 and 6 contain, respectively, high-level block diagrams for a watermarking system and a watermark detector according to embodiments of the present invention.

FIG. 5 shows the essential components of one watermarking system 60 that inserts watermarks in a perceptually-uniform domain. The input to system 60 comprises features $X_i$ and a watermark sequence $S_i$. $X_i$ can be, e.g., a subset of the coefficients from a frequency-based representation of an input digital media object. Perceptual transform 62 transforms each feature $X_i$ to a corresponding perceptual domain feature $z_i$. Watermark embedder 64 calculates a watermarked perceptual domain feature $z^*_i$ based on $z_i$ and $S_i$. For example, if the common JND threshold is $T_z$, then embedder 64 can set $z^*_i = z_i + T_z\ S_i$. An inverse perceptual transform 66 then transforms $z^*_i$ out of the perceptual domain to a corresponding feature $x^*_i$.

Figure 6:
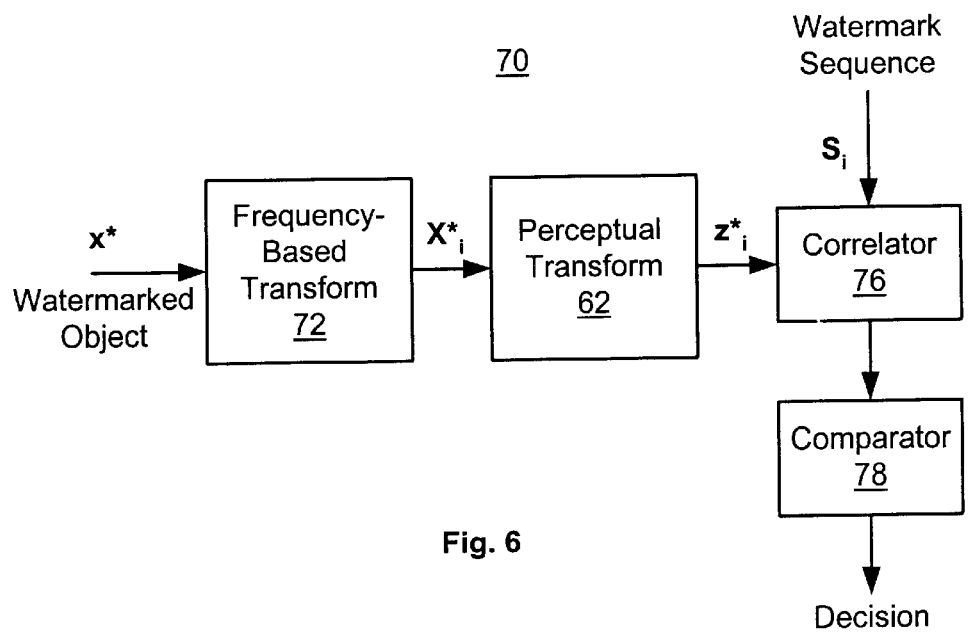

FIG. 6 shows the essential components of one watermark detector 70 that detects watermarks—embedded in a spatial domain object $x^*$—in a perceptually-uniform domain. Frequency-based transform 72 performs, e.g., a wavelet or DCT transform on $x^*$ (if the object is not already in the frequency domain, the same transform that was performed on the original object before the watermark was inserted is performed by 72). A set of features $\{X^*_i\}$ is extracted from the output of transform 72. Perceptual transform 74 transforms each feature $X^*_i$ to a corresponding perceptual domain feature $z^*_i$. Correlator 76 calculates a correlation figure q for $z^*_i$ and $S_i$. Comparator 78 compares q to a threshold in order to decide whether or not the watermark sequence was inserted in $x^*$.

The following analysis shows the validity of the perceptual transform/constant watermarking energy approach of the above embodiment. Let x denote a DCT/wavelet transform coefficient, f denote a corresponding contrast sensitivity function (CSF) value that is normalized to the range of [0,1], and $w^l$ denote an adjustment based on luminance sensitivity (corresponding to $(X_{0,0,b}/X_{0,0})^a$ in the IA-DCT approach). Without loss of generality, assume x is non-negative. Then $$y = x^* f/w^l$$

is a CSF-and-luminance-compensated sample value. The self-contrast masking effect can usually be characterized by a power law function, that is, $$z = y^\alpha = (x^* f/w^l)^\alpha$$

is a perceptual domain in which frequency sensitivity, luminance sensitivity and self-contrast masking effect have all been compensated. There is thus a common constant JND threshold in this domain that characterizes the maximum amount of watermark energy that can be inserted in each sample without incurring visual artifacts. To find this JND threshold $T_z$, the first derivative of z with respect to x is first calculated:

$$dz = f/w^l * \alpha (x^* f/w^l)^{\alpha-1} dx \tag{4}$$

Recall that in the x domain, the JND for x is $T_c = T_f w^l (|x|/(T_f w^l))^w$. If dx in (4) is replaced by $T_c$, then $$T_z = f/w^l * \alpha (x^* f/w^l)^{\alpha-1} * T_f * w^{l*} (x/(T_f w^l))^w$$

Let $T_{min}$ denote the minimum value in the CSF frequency threshold matrix. Then $$f = T_{min}/T_f.$$

If $\alpha$ is chosen to be 1−w, then $$T_z = T_{min}/T_f * \alpha (x^* T_{min}/T_f)^{\alpha-1} * T_f * (x/T_f)^w = \alpha * T_{min}^\alpha$$

The above analysis suggests that the two watermarking implementations, one in the x domain with a variable JND threshold, and the other in the z domain described here with a constant JND, produce an equivalent result to the first degree of approximation. We observe that samples in the z domain have a common JND threshold $T_z$ that can be used to control the amount of watermark energy to be embedded into each sample, i.e., the encoding process is $$z^*_i = z_i + T_z S_{1i}$$

In this case, since $T_z$ is a constant, the optimal choice of $S_{2i}$ for detection is $S_{1i}$. Therefore, by inserting and detecting watermarks in the z domain, the optimal detection can be derived straightforwardly, as opposed to previous works.

Now let us assume the embedding is performed in the x domain with a variable JND threshold. Equation (4) also suggests that a variable modification of $T_c(x_i) S_{1i}$ in the x domain is approximately equivalent to a constant modification of $T_z S_{1i}$ in the z domain. In other words, although the watermarks are embedded in the x domain, we can find the approximate optimal detection in the z domain by first transforming the coefficients to the z domain, then using $S_{1i}$ as the correlating sequence for optimal detection. FIG. 14 shows the distribution of the detector output using this strategy, for the same watermarks as used in the x-domain correlations of FIG. 13. Comparing the results to FIG. 13, it is seen that Case 3 in FIG. 13 achieves performance that is very close to the optimal solution shown in FIG. 14. This may be less true when more image-dependence is added to the perceptual model.

Figure 7:
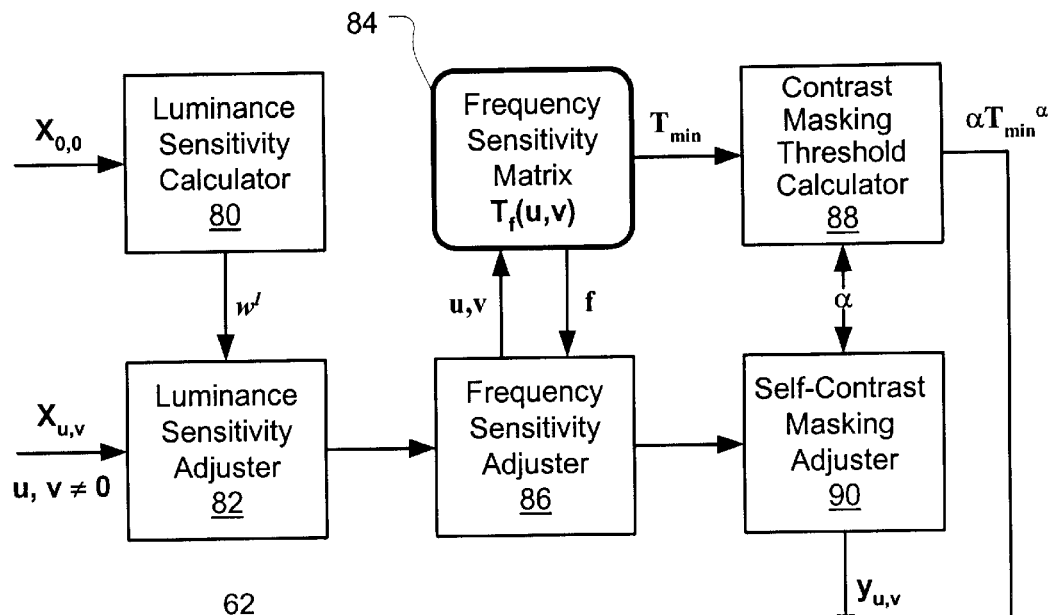
FIG. 7 contains a block diagram for a perceptual transform useful in various embodiments of the invention.

FIG. 7 shows a block diagram for one perceptual transform 62 useful with the present invention. Transform 62 incorporates luminance sensitivity, frequency sensitivity, and self-contrast masking effects. In an actual implementation, of course, it is not essential that each effect be incorporated in the perceptual transform; likewise, additional effects, such as the neighborhood masking effect described below, can exist in the transform.

Luminance sensitivity calculator 80 and luminance sensitivity adjuster 82 transform input frequency-based samples $X_{u,v}$ for luminance sensitivity based on an average luminance figure $w_l$. When used with a block-based transform, $w_l$ varies with each block b:

$$w_l = (X_{0,0,b}/X_{0,0})^\alpha,$$

where $X_{0,0}$ is an overall luminance and $X_{0,0,b}$ is a luminance for the same block as $X_{u,v}$. Adjuster 82 outputs a weighted coefficient value $X_{u,v}/w_l$.

Frequency sensitivity adjuster 86 further weights the coefficient according to a frequency sensitivity function value $f = T_{min}/T_f(u,v)$, where $T_f(u,v)$ is a value selected according to u and v from a stored frequency sensitivity matrix 84, and $T_{min}$ is the minimum value in $T_f$. Adjuster 86 outputs a weighted coefficient $X_{u,v}*f/w_l$. Note that the minimum value $T_{min}$ is also supplied to contrast masking threshold calculator 88.

Constrast masking calculator 88 supplies two thresholds to other computational blocks. The first, $\alpha$, is generally a constant and is preferably set to 1−w if w is also used in the watermarking process. The second, $T_z$, is set to $\alpha T_{min}^\alpha$.

Self-contrast masking adjuster 90 implements a power function $(.)^\alpha$. In general, however, the purpose of adjuster 90 is to scale a frequency-based coefficient according to the ability of that coefficient to mask a signal at approximately the same frequency, orientation, and spatial location represented by that coefficient. The output of adjuster 90 is $$y_{u,v} = (X_{u,v}*f/w_l)^\alpha.$$

Perceptually-significant feature extractor 92 selects appropriate transformed coefficients $y_{u,v}$ for output as $z_{u,v}$. For instance, in addition to the DC components, the highest-frequency components can be excluded from the watermarking/detection process. Also, a coefficient $y_{u,v}$ can be excluded from watermarking selection if its magnitude is less than a percentage of $T_z$.

Perceptually-significant feature extractor 92 is an optional block of transform 62. In other words, one can choose to add the watermark signal to every non-DC component of $X_{u,v}$ (or correlate with every coefficient) by passing each $y_{u,v}$ as $z_{u,v}$.

The perceptual transform approach described above exploits the self-contrast masking effect. But some potential problems exist with this approach for wavelet- or DCT-based systems, due to the mismatch of the wavelet/DCT band structure and filters to the visual system's underlying channels. For example, in a wavelet-based system, there exists an over-masking problem with the diagonal band due to the wavelet transform's Cartesian-separable approach. Typically, this results in artifacts that may be observed around slanted edges.

To overcome, e.g., the over-masking problem at slanted edges, other properties of the HVS can be taken into account. One of the solutions proposed herein is to exploit the masking capability of a complex region, while protecting regions with simple edge structures. More specifically, a masking weighting factor $w_i$ can be derived for each coefficient based on neighborhood activities, e.g., as a function of the amplitudes of neighboring coefficients. An advantage of this strategy is its ability to distinguish between large amplitude coefficients that lie in a region of simple edge structure and those that lie in a complex region. This feature will assure the good visual quality of simple edges on a smooth background, which is often critical to the overall perceived visual quality, especially for wavelet- or DCT-based watermarked images.

The self-contrast masking effects exploited in the perceptual transform assume that each signal associated with a coefficient lies on a common flat background. In a real image, however, this is usually not the case. Each signal is superimposed on other spatially-neighboring signals that contribute some masking effect. This neighborhood masking effect can be exploited by calculating $w_i = g(N_i(\{z_k\}))$, where $N_i(\{z_k\})$ comprises the neighboring signals denoted in vector form. Neighboring signals could be taken from coefficients in the same subband, or from coefficients relating to the same general spatial location but in other subbands. One example of a function $g(.)$ is $$w_i = b\left(1 + a \sum_{k\,near\,i} |x_k|^\beta / |\Phi_i|\right), \quad (5)$$

where a and b are normalization factors, $|\Phi_i|$ is the size of the neighborhood, and $\beta$ is a positive value, and the neighborhood contains coefficients in the same band that lie within an N×N window centered at the current coefficient. $\beta$ and N play important roles in differentiating coefficients around simple edges from those in a complex area. N controls the degree of averaging; $\beta$ controls the influence of the amplitude of each coefficient. Preferably $\beta$ should be chosen as a value less than 1, e.g., 0.2. This helps protect coefficients around simple sharp edges, since the coefficients around sharp edges usually have high values. A small value of $\beta$ suppresses the contribution of large coefficients around sharp edges to the masking factor.

There are at least two ways to exploit the neighborhood masking weighting factor $w_i$. The first is to use $w_i$ to normalize $z_i$, i.e., $z_i \rightarrow p_i = z_i/w_i$. With this method, the p domain is considered perceptually uniform, including neighborhood masking weighting. A common constant JND $T_p$ can be derived in this domain to control the amount of watermark energy inserted into each sample, i.e., $p*_i = p_i + T_p S_{1i}$. The second way to exploit neighborhood masking is to not adjust the samples for $w_i$, but to vary the amount of watermark energy inserted in the z domain according to $w_i$, i.e., $z*_i = z_i + w_i T_p S_{1i}$ in the z domain. But since this masking weighting factor $w_i$ is usually a function of the neighboring coefficients (and neighboring watermarks $S_{1i}$ at the detector), the optimal detection is not clear. A good solution is to just use $S_{1i}$ as the correlation sequence to detect in the z domain.

Figure 8:
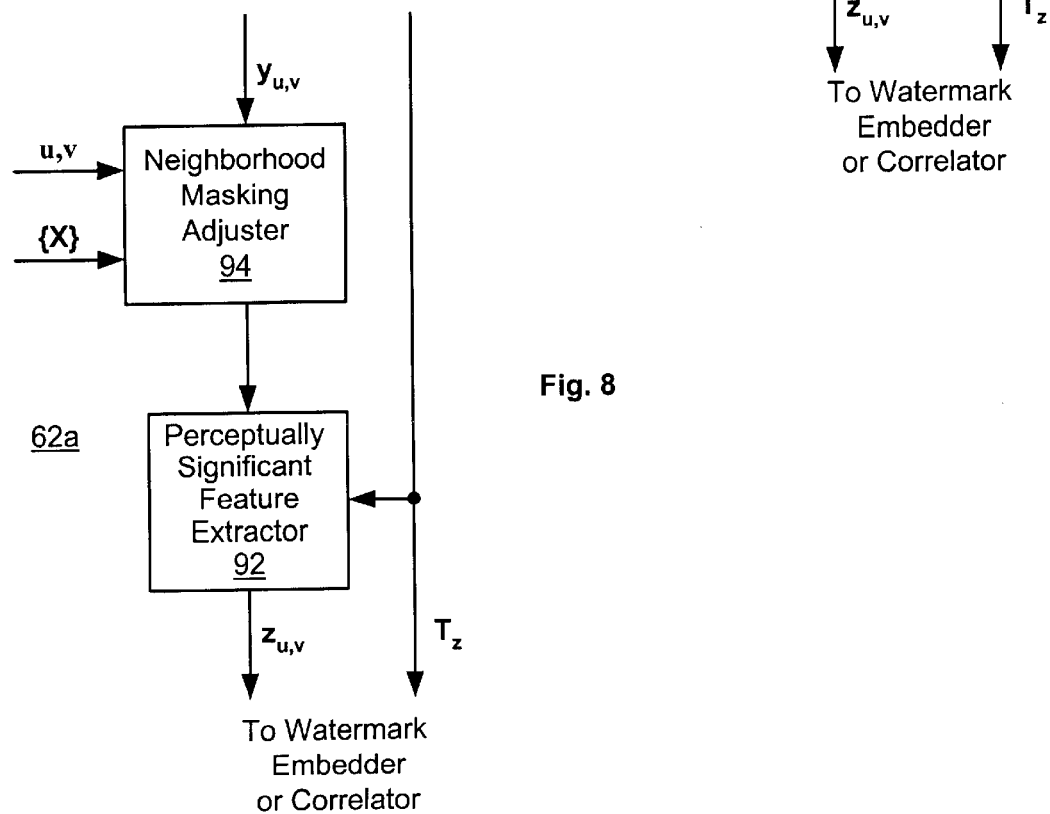
FIGS. 8 and 9 contain block diagrams for modifications to the perceptual transform of FIG. 5 according to other embodiments of the invention.

Block diagrams 62a and 62b (see, respectively, FIGS. 8 and 9) show modifications to perceptual transform 62 to incorporate neighborhood weighting. Block diagram 62a of FIG. 8 shows a neighborhood masking adjuster 94 that accepts $y_{u,v}$, the corresponding u, v values, and the input coefficient array {X}. Adjuster 94 determines the appropriate neighborhood for u and v, and computes a statistic $w_{u,v}$, e.g., according to Equation (5). The weighted sample $y_{u,v}/w_{u,v}$ is then passed to perceptually significant feature extractor 92. Note that instead of X samples, the neighboring perceptual domain y samples can be used in the calculation of $w_{u,v}$. Equation (5) can be made causal by using only those y samples in the calculation that have been fully evaluated.

Figure 9:
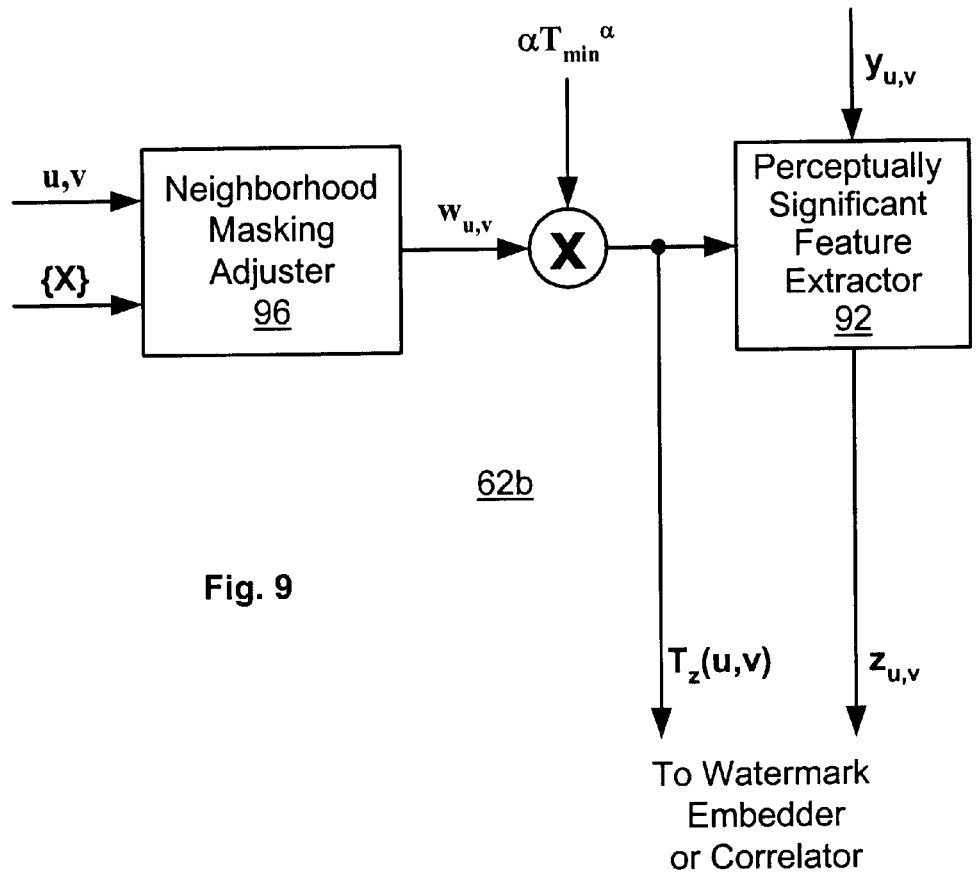

Alternately, neighborhood weighting can be incorporated as shown in block diagram 62b of FIG. 9. Neighborhood masking adjuster 96 can compute a statistic $w_{u,v}$ in the same manner as adjuster 94 of FIG. 8. But instead of weighting the perceptual domain coefficients themselves, adjuster passes $w_{u,v}$ to a multiplier 98. Multiplier 98 calculates a JND threshold for $y_{u,v}$, e.g., it calculates $T_z(u,v) = w_{u,v} \alpha T_{min}^{\alpha}$.

Figure 10:
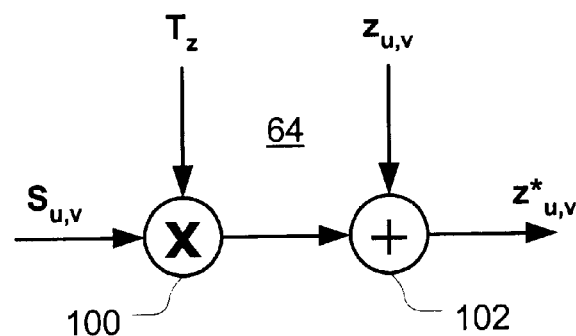
FIG. 10 illustrates a watermarker useful in some embodiments of the invention.

FIG. 10 shows a block diagram for a watermark embedder 64 useful with embodiments of the present invention. Multiplier 100 weights the watermark $S_{u,v}$ by multiplying $S_{u,v}$ by the JND threshold $T_z$. The multiplier output is provided as one input to adder 102, along with the perceptual domain sample $z_{u,v}$. The output of adder 102 is the watermarked perceptual domain coefficient $z^*_{u,v} = z_{u,v} + T_z S_{u,v}$.

Figure 11:
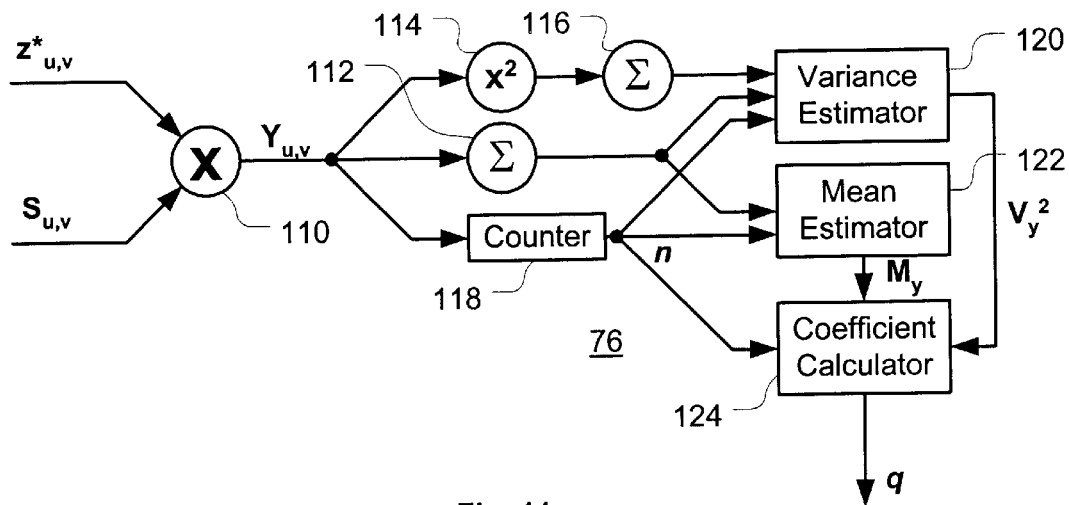
FIG. 11 contains a block diagram for a correlator useful in a watermark detector according to an embodiment of the invention.

FIG. 11 shows a block diagram for a correlator 76 useful with embodiments of the present invention. Multiplier 110 produces (note: this is just a product of two varables) values $Y_{u,v} = z^*_{u,v} S_{u,v}$. Each $Y_{u,v}$ value passes to summer 112, squarer 114, and counter 118. The output of squarer 114 passes to a second summer 116. Counter 118 tallies the number of values n represented in the summations output by 112 and 116.

Variance estimator 120, mean estimator 122, and coefficient calculator 124 use the output of summers 112 and 116 and counter 118. Variance estimator 120 uses these values to calculate a sample variance $V_y^2$. Mean estimator 122 uses these values to calculate a sample mean $M_y$. Coefficient calculator 124 produces a correlation coefficient q, according to Equation 3, using n, $M_y$, and $V_y^2$.

Figure 12:
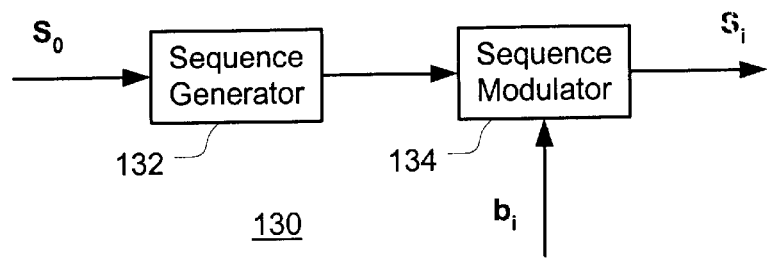
FIG. 12 contains a block diagram for a subsystem that generates a watermarking sequence.

Although the detailed description has not focused on how the watermark sequence is provided to the watermarking system and the watermark detector, FIG. 12 illustrates one possible subsystem 130 for calculating a watermark sequence from a key $S_0$. A sequence generator 132 calculates a desired PN sequence using $S_0$ as a seed to derive the PN sequence. Optionally, if information bits $b_i$ are to be included in the watermark sequence, sequence modulator 134 inserts them, e.g., by toggling the sign on a corresponding PN sample when $b_i=1$.

Although one of the strengths of the disclosed perceptual domain watermark detection is its performance without a copy of the original object, this does not preclude usage of an original object. For instance, a set of perceptual domain features $\{z_i\}$ corresponding to the original version of the digital media object can be subtracted from $\{z^*_i\}$ prior to calculating a correlation figure q.

It is noted that the functions of the disclosed watermarking systems and the disclosed watermarking detectors lend themselves to either hardware or software implementation. The watermarking system can be implemented, e.g, in a general-purpose computer, a media capture device such as a digital camera, scanner, voice recorder, or digital video recorder, an editing device, or a media distribution device. The watermarking detector can be implemented, e.g., in a general-purpose computer, a media playback device, an editing device or program, or a media distribution device.

One of ordinary skill in the art will recognize that the concepts taught herein can be tailored to a particular application in many advantageous ways. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of detecting a watermark in a digital media object comprising:

for a set of features $\{x_i^*\}$ extracted from a digital data set, transforming each feature $x_i^*$ to a corresponding perceptual domain feature $z_i^*$ in a perceptual domain feature set $\{z_i^*\}$;

providing a set of pseudorandom numbers $\{S_{1i}\}$ derived from a selected watermark key; and calculating a correlation figure q for $\{z_i^*\}$ and $\{S_{1i}\}$; wherein the transforming operates on a set of frequency-based coefficients, transforming a frequency-based coefficient to a corresponding perceptual domain coefficient according to at least one of a frequency sensitivity function value, a luminance sensitivity adjustment, and a self-contrast masking coefficient.

2. The method of claim 1, wherein $$q = \frac{M_y \sqrt{n}}{V_y},$$

where n is the number of features in the set $\{x_i^*\}$, $Y_i = z_i^* S_{1i}$, $M_y$ is the sample mean of $\{Y_i\}$, and $V_y^2$ is the sample variance of $\{Y_i\}$.

3. The method of claim 1, wherein the digital data set comprises coefficients from a frequency-based representation of a digital media object.

4. The method of claim 3, wherein the digital media object is selected from the group consisting of a digital image, one or more frames of a digital video image sequence, digitized audio, an arrangement of graphical objects, and combinations thereof.

5. The method of claim 3, further comprising extracting a subset of the coefficients from the frequency-based representation of the digital media object as the digital data set.

6. The method of claim 5, wherein extracting a subset comprises excluding lowest-frequency coefficients from selection to the digital data set.

7. The method of claim 5, wherein extracting a subset comprises excluding highest-frequency coefficients from selection to the digital data set.

8. The method of claim 5, wherein extracting a subset comprises excluding a coefficient from selection to the subset when that coefficient has a magnitude less than a corresponding contrast masking threshold.

9. The method of claim 3, wherein the digital media object is a visual object, and wherein transforming each feature $x_i^*$ to a corresponding perceptual domain feature $z_i^*$ comprises calculating $$y_i = (x_i^* f/w^j)^{\alpha},$$

where f is a frequency sensitivity function value corresponding to the frequency represented by $x_i^*$, $w^j$ is a luminance sensitivity adjustment, and $\alpha$ is a self-contrast masking coefficient.

10. The method of claim 9, wherein transforming each $x_i^*$ to a corresponding perceptual domain feature $z_i^*$ further comprises calculating $$z_i^* = y_i/w_i,$$

where $w_i$ is a neighborhood masking weighting factor based on the amplitudes of coefficients, from the frequency-based representation, that exist in a selected spatial relationship to $x_i^*$ defined as a neighborhood.

11. The method of claim 10, wherein $$w_i = b\left(1 + a \sum_{k\,near\,i} |x_k^*|^\beta / |\Phi_i|\right),$$

where a and b are normalization factors, $|\Phi_i|$ is the size of the neighborhood, and $\beta$ is a positive value.

12. The method of claim 3, further comprising using an original version of the digital media object during watermark detection, by providing a set of perceptual domain features $\{z_i\}$ corresponding to the original version of the digital media object, and subtracting $z_i$ from $z_i^*$ prior to calculating a correlation figure q.

13. A watermark detector comprising:
a perceptual transform to calculate a perceptual domain data set corresponding to an input digital media object; and
a correlator to calculate a correlation figure for the perceptual domain data set and a watermark signature, wherein the transform operates on a set of frequency-based coefficients, transforming a frequency-based coefficient to a corresponding perceptual domain coefficient according to at least one of a frequency sensitivity function value, a luminance sensitivity adjustment, and a self-contrast masking coefficient.

14. The watermark detector of claim 13, further comprising a pseudorandom sequence generator capable of accepting a watermark key and generating the watermark signature corresponding to that key.

15. The watermark detector of claim 14, further comprising a sequence modulator to modulate the watermark signature according to preselected signature data.

16. The watermark detector of claim 13, further comprising a frequency-based transform, wherein the input to the frequency-based transform comprises the input digital media object and the output of the frequency-based transform comprises the input to the perceptual transform.

17. The watermark detector of claim 13, wherein the perceptual transform operates on a set of frequency-based coefficients, the perceptual transform comprising a feature extractor to extract a subset of the frequency-based transform coefficients for transformation to the perceptual domain data set.

18. The watermark detector of claim 17, wherein the feature extractor excludes lowest-frequency coefficients and highest-frequency coefficients from selection to the subset.

19. The watermark detector of claim 17, wherein the feature extractor excludes a frequency-based coefficient from selection to the subset when that coefficient has a magnitude less than a corresponding contrast masking threshold.

20. The watermark detector of claim 13, wherein the perceptual transform operates on a set of frequency-based coefficients, the transform comprising a frequency sensitivity adjuster that weights a frequency-based coefficient according to a frequency sensitivity function value corresponding to the frequency represented by that coefficient.

21. The watermark detector of claim 13, wherein the perceptual transform operates on a set of frequency-based coefficients, the transform comprising a luminance sensitivity adjuster that weights a frequency-based coefficient according to a local average luminance figure.

22. The watermark detector of claim 13, wherein the perceptual transform operates on a set of frequency-based coefficients, the transform comprising a self-contrast masking adjuster that scales a frequency-based coefficient according to the ability of that coefficient to mask a signal at approximately the same frequency, orientation, and spatial location represented by that coefficient.

23. The watermark detector of claim 13, wherein the perceptual transform operates on a set of frequency-based coefficients, transforming a frequency-based coefficient $x_i$ to a corresponding perceptual domain coefficient $z_i$ according to the equation $$z_i = (x_i^* f/w^l)^\alpha,$$

where f is a frequency sensitivity function value corresponding to the frequency represented by $x_i$, $w^l$ is a luminance sensitivity adjustment, and $\alpha$ is a self-contrast masking coefficient.

24. The watermark detector of claim 23, wherein the perceptual transform further comprises a neighborhood masking adjuster that adjusts a frequency-based coefficient based on the amplitudes of surrounding coefficients.

25. A watermark detector comprising:
means for transforming a target data set into a perceptual domain data set;
means for deriving a watermark signature from a selected watermark key; and
means for testing the perceptual domain data set for the existence of the watermark signature, wherein the transforming operates on a set of frequency-based coefficients, transforming a frequency-based coefficient to a corresponding perceptual domain coefficient according to at least one of a frequency sensitivity function value, a luminance sensitivity adjustment, and a self-contrast masking coefficient.

26. An apparatus comprising a computer-readable medium containing computer instructions that, when executed, cause a processor or multiple communicating processors to perform a method for detecting a watermark in a digital media object, the method comprising:
for a set of features $\{x_i'\}$ extracted from a digital data set, transforming each feature $x_i'$ to a corresponding perceptual domain feature $z_i'$ in a perceptual domain feature set $\{z_i'\}$;
providing a set of pseudorandom numbers $\{S_{1,i}\}$ derived from a selected watermark key; and
calculating a correlation figure q for $\{z_i'\}$ and $\{S_{1,i}\}$, wherein the transforming operates on a set of frequency-based coefficients, transforming a frequency-based coefficient to a corresponding perceptual domain coefficient according to at least one of a frequency sensitivity function value, a luminance sensitivity adjustment, and a self-contrast masking coefficient.

27. The apparatus of claim 26, wherein $$q = \frac{M_y \sqrt{n}}{V_y},$$

where n is the number of features in the set $\{x_i'\}$, $Y_i = z_i' S_{1i}$, $M_y$ is the sample mean of $\{Y_i\}$, and $V_y^2$ is the sample variance of $\{Y_i\}$.

28. The apparatus of claim 26, wherein the digital data set comprises coefficients from a frequency-based representation of a digital media object.

29. The apparatus of claim 28, wherein the method further comprises extracting a subset of the coefficients from the frequency-based representation of the digital media object as the digital data set.

30. The apparatus of claim 28, wherein the digital media object is a visual object, and wherein transforming each feature $x_i'$ to a corresponding perceptual domain feature $z_i'$ comprises calculating $$y_i = (x_i' * f/w^l)^\alpha,$$

where f is a frequency sensitivity function value corresponding to the frequency represented by $x_i'$, $w^l$ is a luminance sensitivity adjustment, and $\alpha$ is a self-contrast masking coefficient.

31. The apparatus of claim 30, wherein transforming each $x_i'$ to a corresponding perceptual domain feature $z_i'$ further comprises calculating $$z_i' = y_i/w_i,$$

where $w_i$ is a neighborhood masking weighting factor based on the amplitudes of coefficients, from the frequency-based representation, that exist in a selected spatial relationship to $x_i'$ defined as a neighborhood.

32. The apparatus of claim 31, wherein $$w_i = b\left(1 + a \sum_{k\,near\,i} |x_k^*|^\beta / |\Phi_i|\right),$$

where a and b are normalization factors, $|\Phi_i|$ is he size of the neighborhood, and $\beta$ is a positive value.

\* \* \* \* \*

UNITED STATES PATENT AND TRADEMARK OFFICE
CERTIFICATE OF CORRECTION

PATENT NO.     : 6,792,129 B1
DATED          : September 14, 2004
INVENTOR(S)    : Zeng et al.

It is certified that error appears in the above-identified patent and that said Letters Patent is hereby corrected as shown below:

Column 16,
Line 21, "is he size of" should read -- is the size of --.

Signed and Sealed this

Twenty-sixth Day of July, 2005

JON W. DUDAS
*Director of the United States Patent and Trademark Office*